April 3, 1962 — T. FIELDS ETAL — 3,027,891
CARDIAC INDICATOR
Filed Oct. 15, 1957
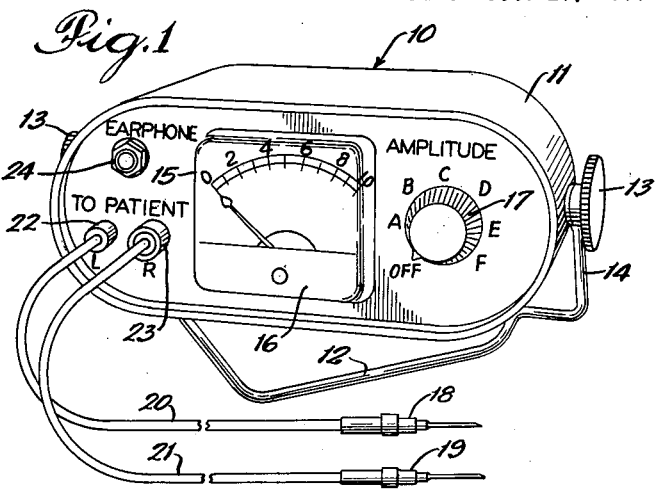
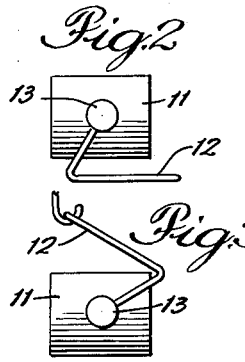
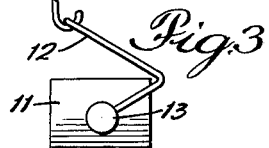
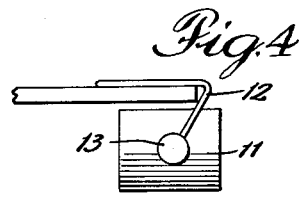
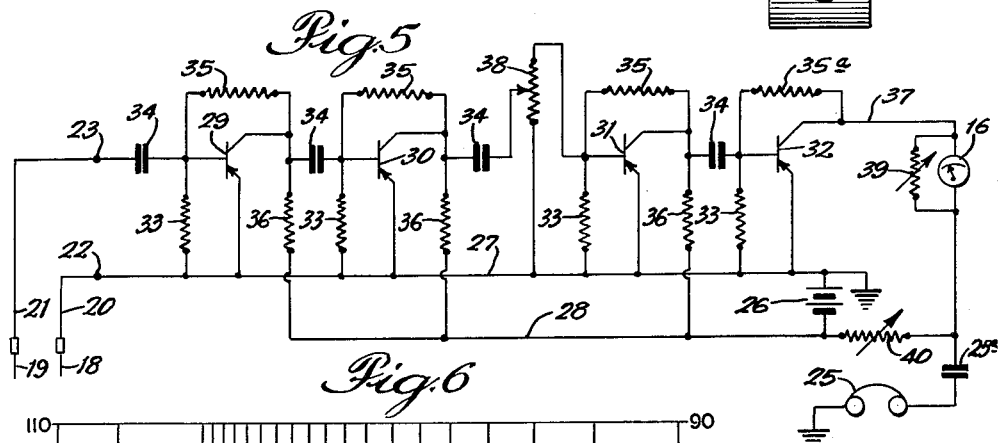
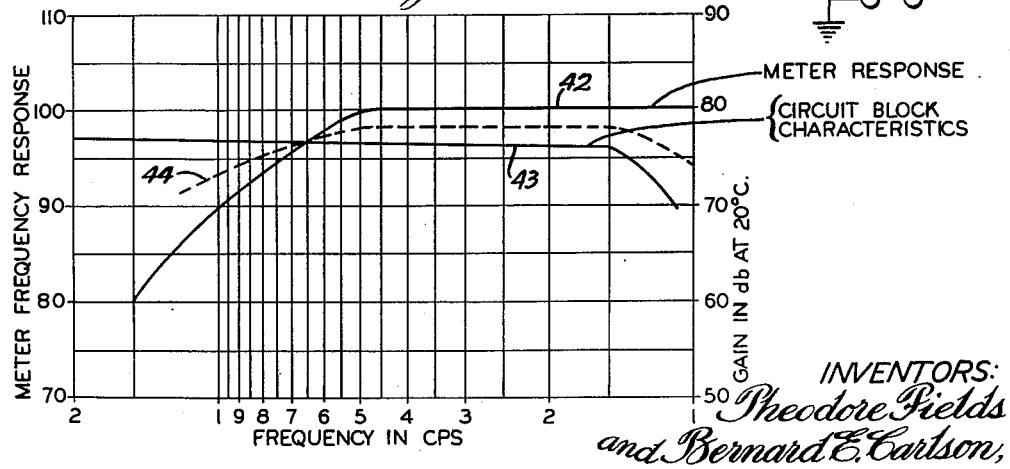
INVENTORS:
Theodore Fields
and Bernard E. Carlson
BY Dawson, Tilton, Fallon & Lungmus
ATTORNEYS.

United States Patent Office 3,027,891
Patented Apr. 3, 1962

3,027,891
CARDIAC INDICATOR
Theodore Fields, Chicago, Ill., and Bernard E. Carlson, La Crescenta, Calif., assignors, by mesne assignments, to The Colson Corporation, Chicago, Ill., a corporation of Ohio
Filed Oct. 15, 1957, Ser. No. 690,236
4 Claims. (Cl. 128—2.06)

This invention relates to a cardiac rate and rhythm indicator and more specifically to a device for providing a continuous and instantaneous indication of heart activity during surgery or medical treatment.

One of the main objects of the present invention is to provide a compact, low cost device for presenting a visual indication of the rate and rhythm of a patient's heart beat. The invention is particularly suitable for use during surgery for the detection of arrhythmias leading to cardiac arrest so that corrective treatment may be promptly initiated, and for the verification of electrical cardiac activity where a patient's blood pressure and pulse may not be detectable clinically, such as in cases of extreme shock or peripheral vascular collapse. Another object is to provide a device for amplifying the electrical impulses resulting from polarization and depolarization of the heart and for registering these amplified signals on a meter, the relative frequency responses of the meter and amplifier being of such a nature that the unit provides a relatively accurate indication of polarization and depolarization despite substantial variation in the rate of heart activity. A further object is to provide a self-contained and easily operated device for indicating the electrical activity of the heart, the device being supportable in different ways so that it may be easily disposed in the most suitable location for use by a surgeon or anesthetist. Another object is to provide an inexpensive cardiac indicator which is safe for use under operating room conditions. A still further object is to provide a cardiac indicator having a satisfactory needle deflection.

FIGURE 1 is a perspective view of a cardiac indicator embodying the present invention;

FIGURE 2 is a side elevation of the device in reduced scale illustrating one position of its wire base;

FIGURE 3 is a side elevation similar to FIGURE 2 but illustrating adjustment of the base for suspension of the device;

FIGURE 4 is a side elevation similar to FIGURE 2 and 3 but showing a third position of the base for hooking the device upon a table surface;

FIGURE 5 is a circuit diagram of the device's electrical system; and

FIGURE 6 is a graph illustrating the relationship between the frequency responses of the meter and the amplifier circuit.

In the embodiment of the invention illustrated in the drawings, the numeral 10 generally designates a self-contained cardiac indicator equipped with a grounded steel casing 11 and a wire base 12 pivotally secured to the casing by a pair of threaded knobs 13. The upturned legs 14 of the V-shaped base are apertured at their ends for pivotally receiving the threaded studs upon which knobs 13 are mounted so that when the knobs are loosened the base may be swung into any of the different positions illustrated in FIGURES 2, 3 and 4 of the drawings. If desired, the knobs 13 may be tightened to clamp the base in the positions illustrated in FIGURES 1 and 2 for placement of the instrument upon an anesthetist's table or upon any suitable flat surface. Alternatively, the base may be turned upwardly to provide a hook for suspension of the device from a parenteral fluid administration stand (FIGURE 3), or it may be completely inverted for suspending the unit from the edge of a table or from any suitable ledge (FIGURE 4).

The front of the casing is provided with a window 15 for exposing the face of a meter 16 mounted therein. To one side of the meter on the casing's face is a control knob 17 for switching the instrument on and off and for controlling the amplitude of the electrical signal. A pair of signal pick-up electrodes 18 and 19 are equipped with leads 20 and 21 which are plugged into sockets 22 and 23, respectively, on the face of the casing. In the illustration given, an additional socket 24 is provided for the plug-in connection of earphones 25 (FIGURE 5). However, it will be understood that a suitable recording device or an oscilloscope may also be connected to the instrument by means of plug-in socket 24.

While needle electrodes are illustrated in the drawings, it is to be understood that other types of electrodes, such as plate electrodes, may alternatively be used. Where plate electrodes are used, they are placed against selected areas of the patient's body after first applying small amounts of electrode jelly upon those areas to eliminate the normal resistance of the skin to the flow of electrical current. The placement of the electrodes may vary considerably depending upon the condition of the patient and the nature of treatment, but excellent results have been obtained where the pick-up electrode 19 is inserted subcutaneously in the precordium and the indifferent electrode 18 is inserted either in the left leg or the right arm.

When the device is set for operation, the low-voltage signals (approximately 1 millivolt) resulting from successive polarization and depolarization of the heart are picked up by the electrodes 18, 19 and are delivered by leads 20, 21 to the four stage resistance-coupled (or resistance-capacitance-coupled) amplifier illustrated diagrammatically in FIGURE 5. Amplifier power for the self-contained unit is supplied from a small three volt dry-cell battery 26 connected by leads 27 and 28 to the emitters, bases and collectors of transistors 29, 30, 31 and 32. The circuit also includes resistors 33, condensers 34, and direct current stabilization loops including the resistors 35 which compensate for the effects of temperature on the transistors. Resistance elements 36 are also provided at the first three stages.

The transistors 29-32 are preferably of the PNP junction type. The emitter of each transistor is connected to the anode of the battery or power supply 26 and this anode is grounded to the casing 11 and the indifferent electrode 18. The base of each transistor is connected through the bias resistor 33 to the anode so that it is slightly negative in relation to the emitter and ground. The collector of each transistor is connected through a resistor 36 to the cathode of the battery 26. The input signal is delivered by lead 21 to condenser 34 which is connected to the base of transistor 29.

The circuit illustrated in FIGURE 5 constitutes a cascade amplification system in which the initial signal is amplified at the first stage and the amplified signal is then fed through the capacitor of the second stage where it is again amplified, this amplification process continuing in the successive stages until the fully amplified signal is carried by lead 37 from the collector of the final stage transistor to the meter 16. Between the second and third stages is a potentiometer 38 for controlling volume or amplitude. This potentiometer is controlled by knob 17 and is provided with a taper such that its rate of change is less in the last third of the control than in the first third in order to provide sufficient sensitivity control over the entire range.

A variable resistance shunt is placed across the terminals of the galvanometer 16 to control the amount of current passing through the instrument. A similar variable resistance 40 may be employed for separately controlling the volume of the signal transmitted to earphones 25 through condenser 25a (10 microfarads). It should be noted that the circuit also provides for grounding the earphones, thereby lessening the effect of hand capacity on the phone.

It has been found that an amplifier circuit constructed in accordance with the above will provide a power gain of approximately 72 decibels (db) where condensers 34 each have a capacitance of 40 microfarads, resistors 33 each have a resistance of 20 kilohms, resistors 35 have a resistance of 15 kilohms, resistor 35a has a resistance of 50 kilohms, and resistors 36 have a resistance of 1 kilohm. Preferably, the meter 16 is a swing coil type commonly referred to as a D'Arsonval galvanometer.

An important aspect of this invention lies in the relationship of the frequency responses of the galvanometer and amplifier circuit. If the normal heart beat of a human being is taken at 70 to 72 beats per minute, it is apparent that the frequency of these beats is slightly greater than one per second. However, the major portion or "R" portion of each heart beat wave has a duration lasting only about one-half to one-tenth of a second, depending upon the heart beat rate. Therefore, for purposes of amplifier and meter operation, the instrument must respond to signal frequencies ranging between two to ten cycles per second. It is within this range that the indicator of the present invention has been found particularly effective and accurate.

Referring to the graph of FIGURE 6, it will be seen that the response of the meter indicated by line 42 is flat or linear within the range of one to five cycles per second and that within this range the meter is substantially 100% accurate. Line 43 indicates that the frequency response of the amplifier circuit is also linear within an overlapping range beginning at about one and one-half cycles per second. Thus, within a frequency range of one and one-half to about five cycles per second the frequency responses of both the meter and the amplifier circuit are linear and parallel, and that between five and ten cycles per second the drop off in accuracy of meter response is only about 10%. In other words, the characteristics of the meter are such that the needle will swing with uniform amplitude for a given direction of movement away from and back to the base point for each of a series of electrical impulses of a frequency less than five cycles per second, and if the frequency of the impulses is increased to ten cycles per second, the reduction in distance of needle travel is only about 10%. Line 44 represents the average or resultant curve of lines 42 and 43 and shows that within the working range of one and one-half to ten cycles per second the combined frequency responses of both the meter and amplifier are substantially flat or linear. As a result, the meter and amplifier circuit cooperate to provide a relatively accurate visual indication of the polarization and depolarization of the heart despite normal variations in the heart beat rate.

Although signals within the three to ten cycle per second range are too low to be audible, these low frequency signals are nevertheless detectable through earphones 25 because of modulation of transistor noise level signals. These noise level signals are of such a high frequency (greater than one kilocycle) that they are out of the frequency range of the meter and therefore are not visible on the meter.

After the signal detectors or electrodes 18 and 19 have been applied to a patient and connected by leads 20 and 21 to the indicator circuit, the amount of needle deflection of galvanometer 16 may be adjusted by rotation of the amplitude control knob 17 which varies the setting of potentiometer 38. Preferably, the needle swing should be plus or minus approximately 25% of the scale to facilitate observation and detection of any significant deviations in the electrical activity of the heart. The base point of needle swing is preferably present at approximately four on the meter scale (4 milliamps.) illustrated in FIGURE 1 and while the base point may be adjusted by regulating the variable resistance 39, such adjustment is generally made only at the factory and not during normal use. If the base point drops below 1.5 milliamps. during use, this indicates that the batteries should be replaced. The variable resistance 40 has slight effect on the meter and is also factory set to provide a suitable sound volume.

It will be noted that the low frequency resistance-coupled circuit has a built-in bias or non-linear amplification arising principally from the action of base resistors 33 so that the indicator needle of the galvanometer will have greater kick in a positive direction than in a negative direction. This "kick" results in a sharp and positive indication of cardiac rate and rhythm.

Visual observation of the output wave represented on an oscilloscope demonstrates that such increased needle deflection or "kick" occurs where, as in the present embodiment, the bias resistance is sufficient to distort the shape of the wave so that the positive one-half cycle of that wave has a relatively flat top while the remaining one-half cycle has a substantially normal configuration. Thus, the distortion of the signal as it is amplified contributes significantly in providing a clear and easily followed visual indication of cardiac rate and rhythm.

From the foregoing, it is believed apparent that the cardiac monitor of the present invention is particularly suitable for use during surgery to provide a continuing indication of cardiac electrical output. Since its low voltage power supply (3 volts) is well below the 8 volt maximum recommended for electrical devices to be used in operating rooms (National Fire Protection Association, Booklet No. 56, section 5–21 (a)) there is virtually no danger that the unit will spark or touch-off the explosive gases frequently used in connection with surgery. Furthermore, since the only adjustment, if any, during use relates to the amplitude of the signal, nurses, technicians, and even non-medical rescue personnel can easily and readily operate the device.

While in the foregoing an embodiment of the present invention has been disclosed in considerable detail for purposes of illustration, it will be understood by those skilled in the art that many of these details may be varied widely without departing from the spirit and scope of the invention.

We claim:

1. In a device for indicating the electrical activity of the heart which is reflected in electrical impulses occurring sequentially with each polarization and depolarization of the heart and which impulses are characterized by frequencies which are independent of the heart beat and which fall substantially within the range of three to ten cycles per second: the combination of a signal pick-up device, an amplifier, and indicating means having input terminals, said signal pick-up device comprising electrodes adapted to be connected to a patient for sensing said electrical impulses, said amplifier having its input connected to the electrodes of said signal pick-up device and having its output connected directly to said input terminals of said indicating means, said amplifier including means for proportionately amplifying the magnitude of each input impulse to a desired degree while maintaining a frequency-response characteristic curve deviating in one direction from linearity for frequencies within said range of three to ten cycles per second, said indicating means including means for giving a perceptible effect in response to each of said amplified impulses while maintaining a frequency-response characteristic curve deviating from linearity in a direction opposed to that of the frequency-response curve of said amplifier, for frequencies within said frequency range of three to ten cycles per second, whereby said perceptible effect of the indicator means is substantially independent of the frequency of said impulses and whereby each impulse sensed by said signal pick-up device is translated into a separate perceptible effect proportional to the magnitude of the impulse.

2. The device of claim 1 in which the amplifier comprises a multiple stage, cascade arrangement of transistors, capacitances, and resistances and includes resistance means for distorting substantially independently of frequency the wave shape of each output impulse from correspondence with the wave shape of its associated input impulse by flattening its top and steepening its initial wave front whereby the said perceptible effect given in response to each of said distorted output impulses is provided with a distinctive "kick" characterized by a greater rate of build-up than of decay of the effect.

3. In a device for indicating the electrical activity of the heart which is reflected in electrical impulses occurring sequentially with each polarization and depolarization of the heart and which impulses are characterized by frequencies which are independent of the rate of heart beat and which fall substantially within the range of three to ten cycles per second, the combination of a signal pick-up device, an amplifier, and indicating means having input terminals, said signal pick-up device comprising electrodes adapted to be connected to a patient for sensing the said electrical impulses, said amplifier having its input connected to the electrodes of said signal detector and having its output connected directly to said terminals of said indicating means, said amplifier including means providing substantially linear frequency-response within a range of three to ten cycles per second while amplifying each input impulse to a proportionately increased output impulse, said indicating means including means providing a perceptible effect in response to each of said amplified impulses while maintaining substantially linear frequency-response within said range of frequencies, whereby said effect is substantially independent of the frequency of each of said impulses throughout the said range thereof and whereby each impulse sensed by said signal pick-up device is translated into a separate perceptible effect proportional to the magnitude of the impulse.

4. The device of claim 3 in which the amplifier comprises a multiple stage, cascade arrangement of transistors, capacitances and resistances, and includes resistance means for distorting substantially independently of frequency the wave shape of each output impulse from correspondence with the wave shape of its associated input impulses by flattening its top and steepening its initial wave front whereby the said perceptible effect given in response to each of said distorted output impulses is provided with a distinctive "kick" characterized by a greater rate of build-up than of decay of the effect.

References Cited in the file of this patent

UNITED STATES PATENTS

| | | |
|---|---|---|
| 2,756,741 | Campanella | July 31, 1956 |
| 2,801,629 | Edmark | Aug. 6, 1957 |
| 2,848,992 | Pigeon | Aug. 26, 1958 |

OTHER REFERENCES

"Electronic Engineering," vol. 26, August 1954, pp. 330–334.

"Electronic Engineering," vol. 29, March 1957, pp. 125–127.

"British Journal of Anaesthesia," vol. 27, 1955, pp. 261–263.